E. A. MORPHEW.
Check-Rower.

No. 223,679. Patented Jan. 20, 1880.

Witnesses.
A. Ruppert,
James H. Lange.

Inventor:
Enos A. Morphew.
Alton Brothers
Attorneys.

UNITED STATES PATENT OFFICE.

ENOS A. MORPHEW, OF PETERSBURG, ILLINOIS.

CHECK-ROWER.

SPECIFICATION forming part of Letters Patent No. 223,679, dated January 20, 1880.

Application filed August 29, 1879.

*To all whom it may concern:*

Be it known that I, ENOS A. MORPHEW, of Petersburg, in the county of Menard and State of Illinois, have invented certain new and useful Improvements in Check-Rowers; and I do hereby declare that the following is a full, clear, and exact description of the invention, which will enable others skilled in the art to which it appertains to make and use the same, reference being had to the accompanying drawings, and to letters of reference marked thereon, which form a part of this specification, and in which—

Figure 1:
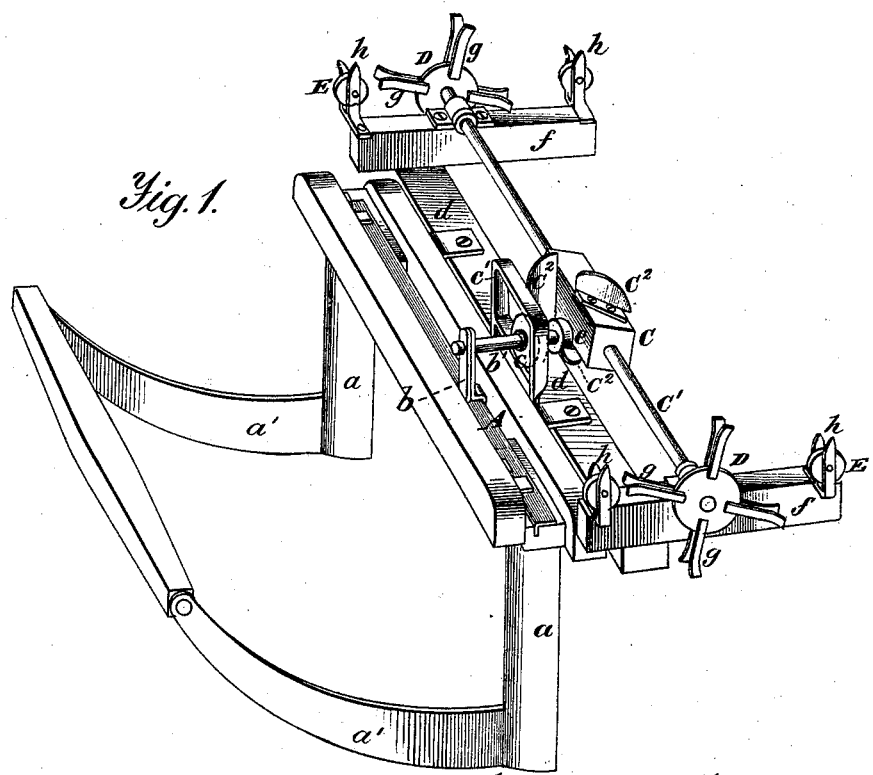
Figure 2:
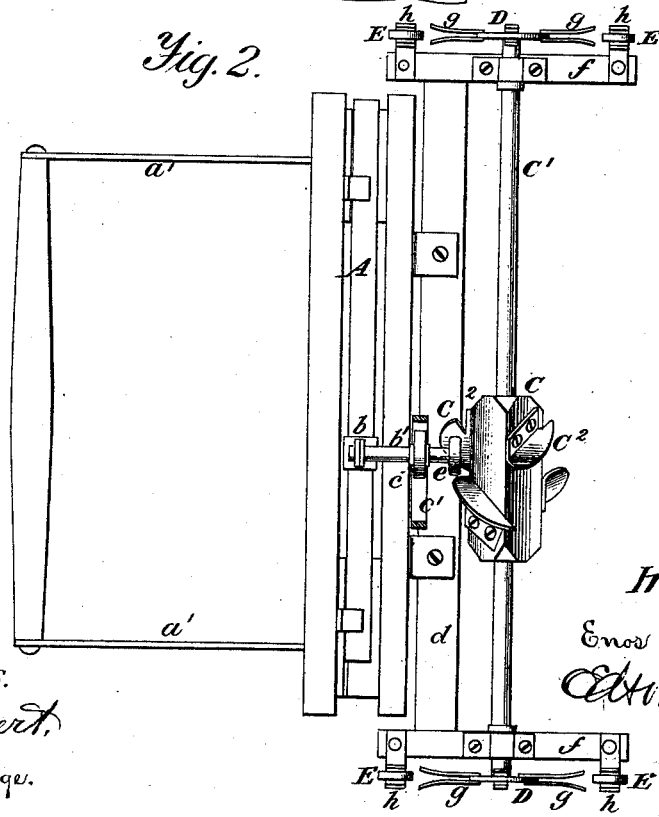

Figure 1 is a plan view of my improved corn or seed planter. Fig. 2 is a side elevation thereof.

The same letter in the several figures denotes the same part.

This invention relates to certain improvements in that class of corn droppers or planters in which the seed or corn dropping slide is operated through the combined movement of the machine and a line or rope stretched across the field, which line is knotted or beaded and passes over pulleys upon the machine, with its knots or beads affecting a reel upon a shaft having means for operating the corn-dropping slide so as to cause it to revolve, and thus effect the dropping of the seed or corn.

The nature of this invention consists of a shaft carrying a cam, with the blades or projections upon each of its sides inclined or arranged in opposite directions and acting upon a frictional roller or arm attached to the dropping-slide, the aforesaid shaft having a reel or reels with slotted or forked arms or spokes, substantially as hereinafter more fully set forth.

In the accompanying drawings, A refers to the seed or corn dropping slide, of the usual construction, and moving within the corn or seed box (not shown) secured upon the legs or conduits $a$ $a$, reaching down to the ground.

To the lower ends of the legs or conduits $a$ are attached the same ends of the upwardly-curved openers $a'$ $a'$, with their upper ends connected together and to the forward end of the machine, or to its tongue or pole.

An upright stud or post, $b$, is fastened about centrally to the slide A, and provided with a right-angled arm or shaft, $b'$, having a roller or wheel, $c$, traveling within an upright frame, $c'$, fastened upon a cross-piece, $d$, in turn fastened to the corn or seed box or other convenient point upon the frame of the machine.

The extreme outer or opposite end of the arm or shaft $b'$ is provided with a frictional roller, $e$, which is struck by the slide-operating cam.

C is the slide-operating cam, located upon the shaft $C'$, hung upon end pieces, $ff$, of the frame of the machine. This cam is provided with a number of blades or wings, $C^2$ $C^2$, each of which is arranged or inclined in an opposite direction or angle to the other, there being a wing or blade upon each side of the cam.

It will be observed that by this arrangement of the wings or blades $C^2$ $C^2$ upon the cam C they will strike the roller of the shaft of the corn-dropping slide so as to impart a quick back-and-forth movement to the said slide, and thus cause it to alternately open and close the openings in the bottoms of the corn or seed boxes and effect the dropping of the corn or seed.

The ends of the cam-shaft $C'$ are provided with reels D D, having slotted or forked arms or spokes $g$ $g$, the function of which will be presently set forth.

E E refer to two sets of pulleys or rollers, each set consisting of two pulleys or rollers, one located in front and the other in rear of each reel, with its shaft-supports $h$ $h$ extending sufficiently above it to prevent the slipping therefrom of the rope or line directly referred to, and by which rope or line, with the movement of the machine, the reels and dropping-slide are operated.

To put the machine in operation the following course is observed: A line or rope is stretched across the field so as to rest upon one set of rollers and pass through one of the arms of the reel on that side of the machine, which line or rope is knotted or beaded at certain intervals. The machine is then put in motion, when it will be seen that as the reel arms or spokes are successively struck by the knots or beads on the line or rope the shaft $C'$ will be rotated, likewise affecting the cam C, and thus causing the seed or corn dropping slide to be vibrated or moved back and forth and effect the dropping of the corn or seed.

This dropper is characteristic for its great simplicity, and is therefore easily constructed, operated, and cheap.

Having thus fully described my invention, I claim and desire to secure by Letters Patent—

1. In a corn-dropper, the shaft $C'$, carrying the cam C, consisting of a number of oppositely-inclined wings or blades, $C^2$ $C^2$, in combination with the seed or corn dropping slide A, provided with the stud $b$, right-angled shaft $b'$, having the frictional roller $e$ and roller $c$, and guide-frame $c'$, within which the roller $c$ of the shaft $b'$ travels, and is limited in its movement, substantially as and for the purpose specified.

2. The combination, with the corn or seed dropping slide A, having stud $b$, arm or shaft $b'$, carrying rollers $c$ $e$, of the guide-frame, cam C, having the oppositely-inclined blades or wings $C^2$, shaft $C'$, having the reel or reels D D, and protected rollers E, substantially as shown and described.

In testimony that I claim the foregoing as my own I hereunto affix my signature in presence of two witnesses.

ENOS A. MORPHEW.

Witnesses:
 WILLIAM R. PARKS,
 CHARLES W. OLIVER.